United States Patent [19]
Cheng et al.

[11] Patent Number: 5,579,476
[45] Date of Patent: Nov. 26, 1996

[54] AUTOMATIC TEST ENVIRONMENT FOR COMMUNICATIONS PROTOCOL SOFTWARE

[75] Inventors: Hsu-Feng Cheng, Hsinchu; Jung-Ming Fang, Taipei Hsizn, both of Taiwan

[73] Assignee: Industrial Technology Research Institute, Hsinchu, Taiwan

[21] Appl. No.: 501,456

[22] Filed: Jul. 12, 1995

Related U.S. Application Data

[63] Continuation of Ser. No. 139,303, Oct. 19, 1993, abandoned.

[51] Int. Cl.⁶ .................................................. G06F 11/00
[52] U.S. Cl. ................................ 395/183.08; 395/183.15
[58] Field of Search ...................... 395/183.08, 183.01, 395/185.02, 183.1, 183.11, 183.14, 183.15, 183.13

[56] References Cited

U.S. PATENT DOCUMENTS 5,233,611  8/1993  Triantafyllos et al. ................. 371/16.1

OTHER PUBLICATIONS

Automator Developer Guide with Examples, Jul. 1991, Version QANDG 1.0 pp. 1–4 to 1–8; 1–12 to 1–15; 4–21 to 4–24; and 5–24 to 5–34.

Automator Programmer Reference Manual, Jul. 1991, Version QANPR 1.0 pp. 1–7; 3–47; 4–24 to 4–25.

Automator User Guide, Jul. 1001, Version QANUG 1.0 pp. 2–2; 3–8 to 3–9; and 5–1 to 5–6.

Beizer, Software System Testing and Quality Assurance, 1984, pp. 91–140.

*Primary Examiner*—Robert W. Beausoliel, Jr.
*Assistant Examiner*—Norman M. Wright
*Attorney, Agent, or Firm*—Meltzer, Lippe Goldstein et al.

[57] ABSTRACT

A test system and method are disclosed for testing a communications protocol software implementation or combination of communications protocol software implementations. The test system has a memory for storing a communications protocol software implementation of a particular layer in a hierarchy of protocols. The test system has a processor for catching data outputted from the communications protocol software implementation to upper and lower layer communications protocol software. The processor is also for interpreting each frame contained in a test case file. In response to interpreting an input data frame, the processor feeds input data contained in the input data frame to the communications protocol software implementation. In response to interpreting an output data frame, the processor compares received data outputted from the communications protocol software implementation with expected output data interpreted from the output data frame, and generates a message depending on this comparison. Furthermore, the processor may simultaneously monitor the execution of the communications protocol software implementation and generate a wake-up message if the communications protocol software implementation properly or unexpectedly ceases execution. In response to receiving a wake-up message, the processor writes an appropriate message in a test report file.

15 Claims, 5 Drawing Sheets

AUTOMATIC TEST ENVIRONMENT FOR COMMUNICATIONS PROTOCOL SOFTWARE

This is a continuation of application Ser. No. 08/139,303, filed Oct. 19, 1993, now abandoned, for AUTOMATIC TEST ENVIRONMENT FOR COMMUNICATIONS PROTOCOL SOFTWARE.

FIELD OF THE INVENTION

The present invention is directed to a system for testing communications software. In particular, the present invention provides a test system for feeding input test data to, and receiving output data from, a communications protocol software implementation or combination of communications protocol software implementations.

BACKGROUND OF THE INVENTION

A communications system typically includes two devices which can communicate with each other either directly or via one or more intermediary communications devices of the communications system. Some examples of communications devices include: private branch exchanges, data terminal equipments, central office switches, ISDN customer premises equipment, etc. These devices communicate with one another according to one or more communications protocols or sets of semantic and syntactic rules for communicating. Some examples of communications protocols include: LAPD (Q.921), Q.931, X.25PLP, LAPB, T.70, T.62, DTAM, and V.120.

Illustratively, devices of the communications system contain protocol software for achieving communication according to the different communications protocols. Such protocol software may be hierarchically organized into levels called layers according to the Open Systems Interconnection (OSI) model. According to OSI, communications protocol software for communicating on the highest layer may be used for requesting high level or abstract communications goals. Communications protocol software of each lower layer may be used for requesting more specific sub-goals of higher layers. Finally, communications protocol software of the lowest layer may be used for requesting low level or actual physical tasks (i.e., the actual transmission or reception of data signals). Typically, a communicating device communicates by first generating a request to perform some relatively abstract goal using high layer communications protocol software. This in turn may cause the device to generate one or more requests to perform more specific sub-goals of the abstract goal using lower layer communications protocol software, etc., until one or more requests are generated using communications protocol software of the lowest layer.

U.S. Pat. Nos. 3,869,603, 4,055,801, 4,108,358, 4,713, 815, 4,759,019, 4,821,266, 4,916,641, and 5,111,402 disclose automated test systems for testing a variety of types of hardware. Advantageously, implementations of communications protocol software for operating devices of a communications system are tested in a simulated environment before they are deployed in the equipment of the communications system. To that end, the communications protocol software implementation under test (IUT) is tested by emulating the data and control message inputs which may be received from higher and lower layer communications protocol software. If in response to these inputs, the IUT outputs the correct data and control messages (as per the protocol of the higher or lower layer), the IUT passes the test.

Traditionally, IUT's have been tested in a test environment 100 such as depicted in FIG. 1. An upper tester 110 is provided for simulating communications protocol software of a higher layer than an IUT 120 from which the IUT 120 may receive messages, or to which the IUT 120 may transmit messages. For example, the IUT 120 may be an X.25PLP software implementation (layer 3 communications protocol software) and the upper tester may contain a T.70 software implementation (layer 4 communications protocol software). The upper tester 110 transmits to, and receives from, the IUT 120 different kinds of simulated inputted data and control messages according to a higher layer protocol. Likewise, a lower tester 130 is provided for simulating communications protocol software on a lower layer than the IUT 120 to which the IUT 120 may transmit messages, or from which the IUT 120 may receive messages. In the above example, the lower tester 130 may contain a LAPB software implementation (layer 2 communications protocol software). The lower tester 130 transmits different kinds of simulated input data and control messages according to a lower layer protocol.

The simulated input data and control messages of the upper and lower testers may be obtained automatically from a test script file 111 or 131, respectively. Alternatively, the input data and control messages may be inputted by a user in an interactive session. In response to receiving these inputted messages, the IUT may output messages to the upper tester 110 and/or the lower tester 130. As shown by the line 140, the test environment 100 must provide intricate synchronization procedures so that the upper tester 110 and lower tester 130 simulate, as close as possible, the actual environment in which the IUT 120 is to be deployed.

FIG. 2 shows a first conventional communications protocol software test system 200 which provides a test environment according to the general environment 100 (FIG. 1). The test system 200 has a testbed 210 which illustratively may be a computer such as a Micro Vax™, manufactured by Digital Equipment Corporation. The IUT 220 is maintained in a separate device 230, e.g., the actual hardware in which the IUT 220 is to be deployed. The testbed 210 communicates with the device 230 via an ISDN S-interface bus 212. Furthermore, a user 240 may input data and control messages to, and receive data and control messages from the device 230. The device 230 in which the IUT 220 resides has lower layer communication protocol software 251 and upper layer communication protocol software 252 which serve to temporarily store information transmitted to the IUT 220 or received from the user 240 or testbed 210.

In operation, the testbed 210 serves as an automatic lower tester. The testbed 210 automatically feeds simulation input data and control message data from a test case file 260 to the IUT 220. The user 240 serves as an upper tester. The user manually inputs data and control messages to, and receives data and control messages from, the IUT 220 during an interactive session. For example, if the testbed 210 is a telephone, the user 240 might lift the handset from the cradle (creating an off-hook signal) and press keys on the telephone keypad. The user receives data from the lower tester 210 in the form of a dial tone, etc.

FIG. 3 depicts a second conventional test system 300 according to the conventional architecture 100 (FIG. 1). An upper tester 350 is provided which is also called the test responder. Both the test responder 350 and the IUT 320 are stored in the device 340 which can be a Sun Microsystems' SUN 3™, SUN 4™, or SPARC™ computers.

The test system 300 has lower tester 330 in the form of a device such as a Sun Microsystems' SUN 3™, SUN 4™, or SPARC™ computers. The lower tester device 330 is a separate device from the device 340. The two devices 330 and 340 can communicate with each other, e.g., via a Sun Microsystems, SUNLINK OSI™ interface 355.

The lower tester 330 contains a test driver program 310, a referencer 360 and an exception handler 370. The referencer 360 is a certified communications protocol software implementation of the same communications protocol(s) as the IUT 320. The referencer 360 may thus be used as a reference as to how the IUT 320 should respond.

The exception handler 370 operates under the control of the test driver program 310. The exception handler 370 is provided for purposes of altering the messages communicated between the referencer 360 and the SUNLINK OSI™ interface 355. The exception handler 370 can thus create an abnormality in the messages outputted from the referencer 360.

In operation, the user compiles a test case file which includes the data to be inputted to, and outputted from, the upper tester 350 and the lower tester 330. The test driver 310 then transfers instructions, using Test Driver Responder Protocol (TDRP) language, regarding the operation of the upper tester 350 to the test responder 350 via the referencer 360, SUNLINK OSI™ interface 355 and the IUT 320. The device 340 and the device 330 then execute appropriate steps to automatically feed input messages to the IUT 320 and to receive output messages therefrom.

The prior art test systems 200 (FIG. 2) and 300 (FIG. 3) have several disadvantages. In the test system 200, the user is required to enter appropriate input data in an interactive session. Such an interactive session is tedious and prone to errors. Moreover, because of the limited speed of human data entry, the test requires a long time to complete. The time factor is important when considering that the same test may be applied to several different IUT's or reapplied to the same IUT in the course of developing the IUT.

In using the test system 300, the IUT is compiled together with a test script file which contains the inputted messages of the upper and lower tester. The tests carried out by each test script file may be planned and separately stored ahead of time. These test script files may then be compiled with the IUT to produce an executable object (machine language) file. However, any time a test or the IUT is modified, the files must be recompiled. Furthermore, an object file (containing the executable machine language code) is produced each time the IUT is compiled with a test script file. Thus, a great deal of effort must be expended in managing the files, for example, to ensure that only current object files are stored and only unneeded object files are discarded.

In both test systems 200 and 300, the data outputted from the IUT is transmitted through the upper and lower testers. The upper and lower testers may have certain error contention capabilities in which the upper and lower testers continue to perform normal operations even in the event erroneous data and control messages are outputted from the IUT. Thus, the upper and lower testers may filter out erroneous data and control messages outputted from the IUT. This reduces the ability to fully test the IUT.

It is thus an object of the present invention to overcome the disadvantages of the prior art.

SUMMARY OF THE INVENTION

The present invention achieves these objects by providing an automatic interpretive test system with a single tester, i.e., the lower and upper tester are combined into a single tester. Furthermore, the test system automatically feeds input data simulating both the upper and lower tester, and checks output data received from the IUT, by sequentially interpreting instructions from a test case file. The test case file may be generated and stored prior to performing the test.

According to one embodiment, a test system is provided with a processor and a memory. Prior to conducting the test, the IUT is stored in the memory. Furthermore, a test case file is prepared containing a sequence of instructions called frames. The frames may be input data frames which contain data to be inputted to the IUT or output data frames which contain expected data to be outputted from the IUT. Illustratively, the input and output data frames are sequentially ordered in the test case file to simulate a test session of requests and responses between the IUT and upper and lower layer communications protocol software. Optionally, the test system may be provided with a disk memory, such as a hard disk drive, for storing test case files. Thus, test files can be planned and stored prior to performing the tests.

During a test, the processor executes a process called the tester. The tester process has four sub-processes: a catcher subprocess, an interpreter subprocess, a feeder subprocess and a comparator subprocess. The catcher subprocess is for receiving data outputted from the IUT to upper and lower layer communications protocol software. The interpreter subprocess is for interpreting each frame of the sequence of frames in the test case file. In response to interpreting an input data frame, the processor executes the feeder subprocess to feed input data contained in the input data frame directly to the IUT. In response to interpreting an output data frame, the processor executes the comparator subprocess to compare output data contained in the output data frame with corresponding output data received by the catcher subprocess. In response to the comparison, the processor illustratively generates messages indicating whether or not the data actually outputted from the IUT matched the expected data contained in the output data frames. Illustratively these generated messages are stored in a test report file.

Illustratively, the processor also contemporaneously executes a second process called the wake-upper. The wake-upper monitors the IUT to determine if the IUT properly completes its execution or if it unexpectedly stops. The wake-upper process generates a wake-up message depending on whether or not the IUT executes properly. Illustratively, this is achieved by assigning a priority to the wake-upper process which is lower than the tester and IUT processes. This ensures that the wake-upper does not execute unless both the tester process and IUT are idle.

The wake-up message generated by the wake-upper process is received by the processor while executing the catcher subprocess and analyzed by the processor while executing the comparator subprocess. Depending on the particular wake-up message, the processor generates an error message or successful execution message. Illustratively, in response to receiving a wake-up message, the processor writes an appropriate message in the above-mentioned test report file.

In short, a flexible test system is provided for testing implementations of communications protocol software or communications software incorporating a combination of protocols. The tester system according to the present invention provides the following advantages:
(1) tedious manual data entry is avoided
(2) human error is avoided
(3) tests require less time to complete
(4) test cases may be predetermined and stored prior to performing the test (5) because the test system is an interpreter, the test cases need not be re-compiled with the IUT each time the IUT or test case is modified (6) file maintenance is minimized (7) because the test system interacts directly with the IUT rather than via upper or lower layer communication protocol software, no erroneous results produced by an IUT with a bug are filtered out, and (8) because a single tester is provided which sequentially interprets frames from a test case file, intricate synchronization between upper and lower testers is not needed.

DETAILED DESCRIPTION OF THE INVENTION

Figure 4:
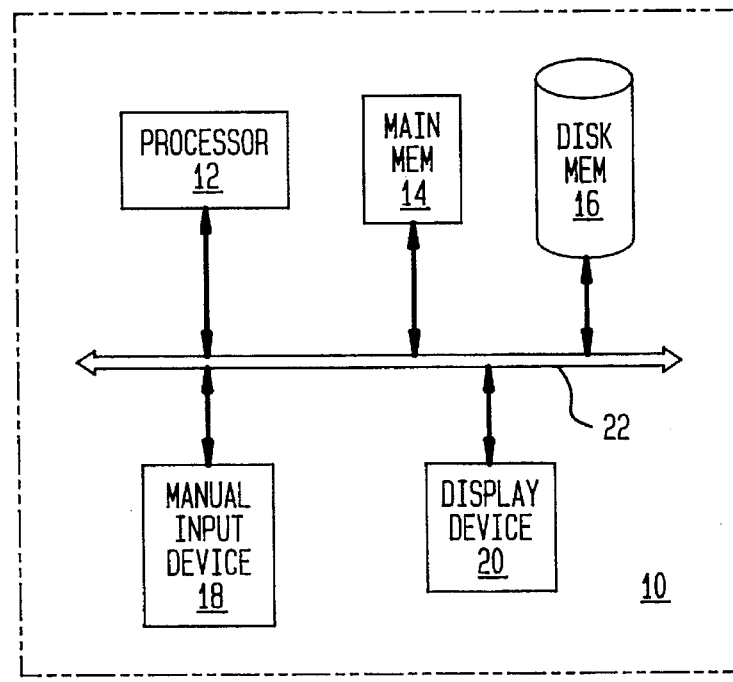
FIG. 4 depicts a communications protocol software test system according to one embodiment of the present invention.

FIG. 4 depicts a test system 10 according to the present invention. Illustratively, the test system 10 is a multi-tasking computer system. The test system 10 has one or more processors 12 or CPU's for executing instructions of processes. The test system 10 also has a main memory 14 and a disk memory 16 such as a hard disk drive. Typically, a process executed by the processor 12 is stored, at least in part, in the main memory 14. The disk memory 16 is used for storing files. In addition, the test system 10 has a manual input device 18, such as a keyboard, and a display device 20, such as a CRT or LCD display. A data bus 22 is also provided for transferring data between different devices of the test system 10.

Illustratively, the processor 12 of the test system is a multi-tasking processor. In other words, the processor 12 is capable of contemporaneously (or simultaneously, if the test system 10 has more than one processor 12) executing more than one process. This is usually achieved by alternately executing one or more instructions of each non-idle process in a round robin fashion. Due to the speed of the processor 12, a user monitoring the input and output of a process via the display device 18 has the impression that all processes are executing simultaneously and continually. Each contemporaneously executing process may be assigned a priority which controls how often that process is executed by the processor 12 in relation to other processes. Processes with higher priorities are allotted more execution time in the processor 12 than processes with lower priorities.

Figure 5:
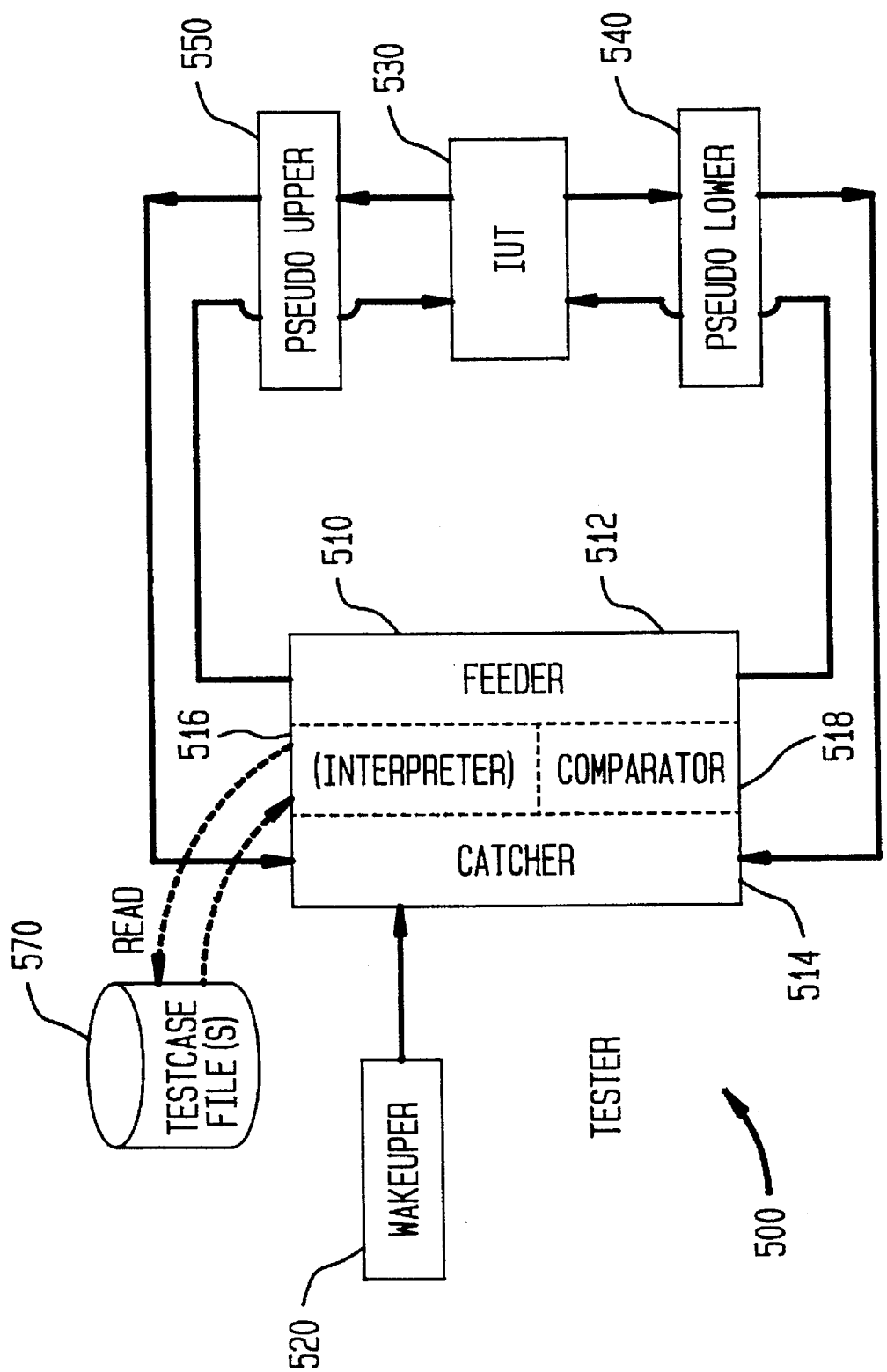
FIG. 5 depicts a functional diagram of the test system of FIG 4.

FIG. 5 shows a functional block diagram of a test system 500 according to one embodiment of the present invention. As shown, the test system 500 executes a tester process 510 and a wake-upper process 520. The tester process 510 can feed messages to, and receive messages from, the IUT 530 via a pseudo lower tester 540 and a pseudo upper tester 550. Illustratively, the tester process 510 performs all aspects of the test. Thus, the pseudo upper tester 550 and pseudo lower tester 540 may be mere buffers.

The tester process 510 includes four sub-processes: a feeder sub-process 512, a catcher sub-process 514, an interpreter sub-process 516 and a comparator sub-process 518. The interpreter sub-process 516 sequentially reads and interprets each frame or instruction of the test case file. These frames are discussed in greater detail below. The feeder sub-process 512 inputs data received from the interpreter sub-process 516 to the IUT 530. The catcher sub-process 514 receives data outputted from the IUT 530. The comparator sub-process 518 compares expected output data in an output data frame interpretted by the interpreter sub-process 516 with output data received by the catcher sub-process 514.

Appendix A depicts two illustrative test case files. A test case file may include a file header (e.g., lines 1–8 or 111–118), a summary (e.g., lines 10–29 or 120–133) and a sequence of one or more frames (e.g., lines 31–110 or 135–171). Each frame begins with a frame designator (e.g., @_DX23). Frames may be input data frames, output data frames, SET frames or GOTO frames. Input and output data frames have the following syntax:

[<frame no.>] <comment>
   HEADER $h_1$ $h_2$ $h_3$ $h_4$ $h_5$ $h_6$ $h_7$ $h_8$ $h_9$ $U_{test}$ $T_x/R_x$ $U_{level}$ Info
   {<no. data items>} <data items>

The frame number is a unique label from 1 to 65535 which distinguishes the frame from other frames. Comments may be provided following the frame number. HEADER identifies the beginning of the header. The nine following bytes $h_1$ $h_2$ $h_3$ $h_4$ $h_5$ $h_6$ $h_7$ $h_8$ $h_9$ are reserved for later expansion. A value $U_{test}$ follows which value serves as the process identifier of the IUT. The next bit $T_x/R_x$ indicates whether the data contained in the frame is input data ($T_x/R_x=0$) to be fed into the IUT 530 or whether the data is expected output data ($T_x/R_x=1$) to be received from the IUT 530. The next bit $U_{level}$ is the process identifier of the pseudo level via which data contained in the frame is to be received or transmitted ($U_{level}=0$ indicates pseudo upper level and $U_{level}=1$ indicates pseudo lower level). A series of four "Info" digits follows indicating the kind of information represented by the data frame.

The number in the braces indicates the number of data items to be inputted to, or expected to be outputted from, the IUT 530 which input data items or expected output data items follow the number in the braces. Data items can take the following form:

(1) A 0-ff hexadecimal value representing one byte.

(2) ? indicating a byte of unspecified value. The value of such a data item is irrelevant as this data item is to be ignored.

(3) Uzz indicating an auto-variable. Illustratively, 256 byte sized auto-variables are provided in the test system 500. Each auto variable functions as an ordinary variable. Thus, the expression Uf8 returns the value stored in the auto variable Uf8. Operations may be performed on auto variables using the following syntax: Uzz op1 z1 op2 z2 op3 z3, etc., where each operation $op_i$ can be "+", "−", "*", "/", "&" (logical AND), "|" (logical OR), "^" (logical XOR), ">" (right bit-shift), and "<" (left bit-shift).

(4) Szz indicating that a value is stored in an auto-variable. This data item only occurs in an output data frame for causing data outputted from the IUT 530 to be stored in a particular auto-variable.

A SET frame is indicated by the word "SET" following the frame designator @_DX23. The SET frame is used for storing values in auto-variables. For example, in lines 36–37 of Appendix A, 16 is stored in the auto-variable Ue8 and 40 is stored in the auto-variable Uf8.

A GOTO frame is indicated by the word "GOTO" following the frame designator @_DX23. The GOTO frame causes the processor 12 (FIG. 4) to branch to the frame indicated by the label contained in the GOTO frame. For example, after interpreting the GOTO frame in line 171 of Appendix A, the processor 12 (FIG. 4) resumes interpreting with frame 4 on line 145. GOTO frames are useful for causing the processor 12 to repeatedly interpret a particular sub-sequence of frames of the test case file.

Figure 6:
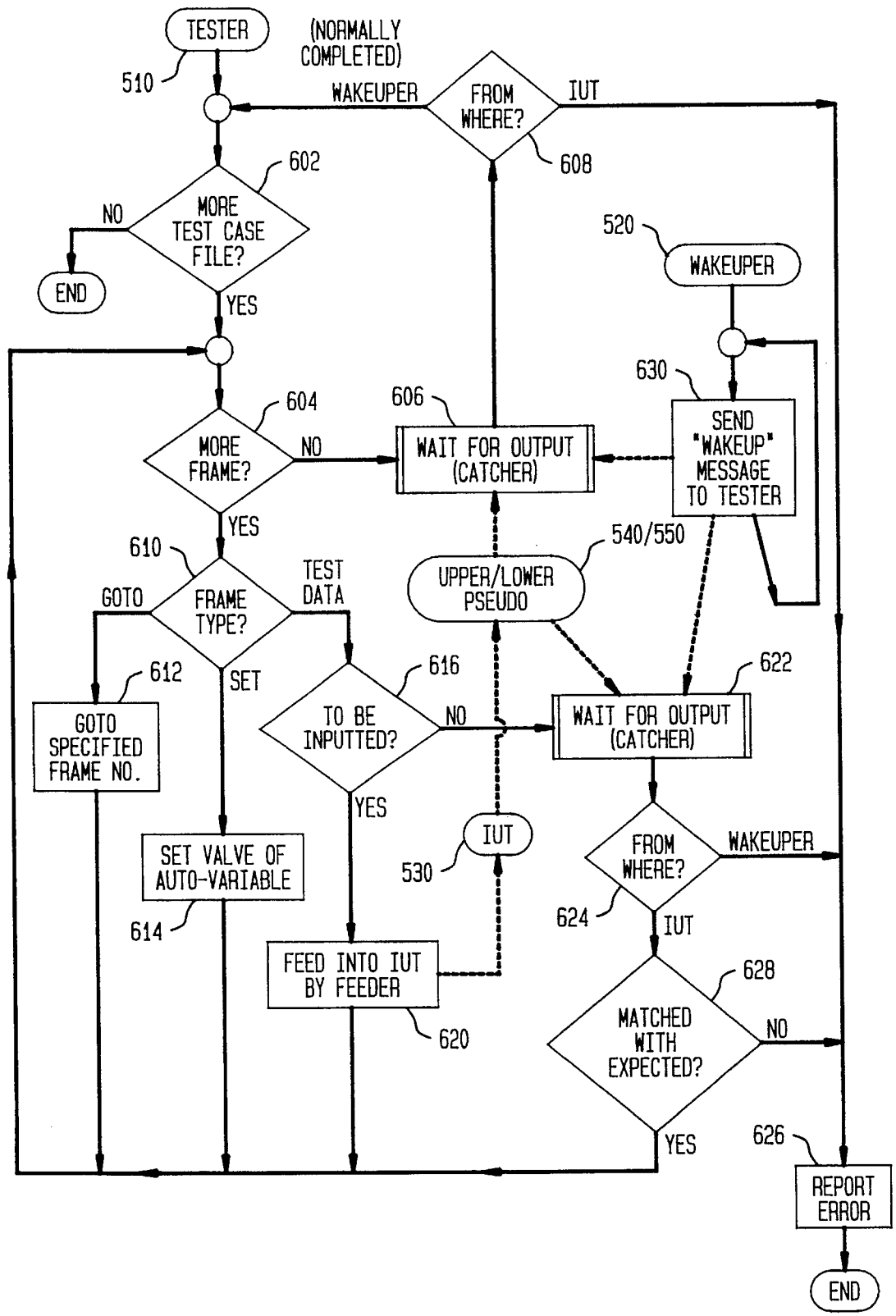
FIG. 6 is a flowchart which schematically illustrates the operation of the test system depicted in FIGS. 4–5.

FIG. 6 shows a flowchart illustrating the execution of the test system 500. Referring to FIGS. 4, 5, and 6, the operation of the test system 500 is now illustrated. Initially, the processor 12 loads the IUT 530 into the memory 14 from, e.g., the storage device (disk memory) 16 for execution. The processor 12 then executes the interpreter sub-process 516 by proceeding to step 602. In step 602, the processor 12 determines whether there are any test case files left to interpret. Illustratively, the test system 500 can interpret one or more sequences of frames in one or more test case files. If all test case files have been interpreted, the processor 12 ceases execution. Otherwise, the processor executes step 604 in which the processor 12 determines if there are any more frames left in the currently interpreted test case file. If not, the processor 12 switches to executing the catcher sub-process 514 by proceeding to step 606. If there are frames left, the processor 12 continues executing the interpreter sub-process 516 by interpreting the next frame in step 610.

In step 610, the processor 12 determines whether the currently interpreted frame is an input/output data frame, a SET frame or a GOTO frame. In the event that the frame is a GOTO frame, the processor 12 executes step 612. In step 612, the processor 12 causes interpretation to branch to the frame indicated by the label in the GOTO frame. That is, when the processor 12 executes a step requiring the interpretation of the next frame (step 610), the processor 12 will resume interpretation at the frame indicated by the label in the GOTO frame. The processor 12 then returns to step 604.

In the event the frame is a SET frame, the processor 12 executes step 614. Therein, the processor 12 stores an appropriate value in the auto-variable indicated by the SET frame. The processor then returns to step 604.

In the event the frame is a data frame (i.e., input or output), the processor 12 proceeds to step 616. Therein, the processor 12 determines whether the data frame is an input data frame or an output data frame. In the event the data frame is an input data frame, the processor 12 executes the feeder sub-process 512 by proceeding to step 620. Therein, the processor 12 feeds the data contained in the input data frame directly to the IUT 530. The processor 12 then returns to step 604.

In the event the data frame is an output data frame, the processor 12 first switches to executing the catcher sub-process 514 by proceeding to step 622. In step 622, the processor 12 waits until either output data is received from the IUT 530 via the pseudo upper tester 540 or pseudo lower tester 550 or until a wake-up message is received from the wake-upper process 520 (as discussed in greater detail below).

When a wake-up message or output data is received, the processor executes the comparator sub-process 518 by proceeding to step 624. Therein, the processor 12 first determines whether a wake-up message or output data was received. If a wake-up message was received, the processor 12 proceeds to step 626, wherein the processor 12 reports an error in a test report file and ceases execution. Otherwise, the processor 12 proceeds to step 628 in which the processor 12 compares the actually received output data with the output data contained in the interpreted output data frame. If they are not the same, the processor proceeds to step 626, wherein the processor reports an error in the test report file and ceases execution. Otherwise, the processor 12 returns to step 604. In addition, the processor 12 may also illustratively indicate in the test report file that data was properly received if the received output data matches the expected output data. For example, see Appendix B which shows two sample test report files generated for the two test case files of Appendix A.

In step 606, the processor 12 waits to receive data outputted from the IUT 530 via the pseudo upper or pseudo lower tester 540, 550 or a wake-up message from the wake-upper 520 (in a similar fashion to step 622). Upon receiving either output data or a wake-up message, the processor 12 switches to executing the comparator sub-process 518 by proceeding to step 608. In step 608, the processor 12 determines whether a wake-up message or output data from the IUT 530 was received. If output data was received, then an error has occurred. Illustratively, all output data must be anticipated by an output data frame. Because, there are no more data frames to be interpreted (step 604) there are no output data frames anticipating output data. In such a case, the processor 12 proceeds to step 626 and an error is written in the test report file.

On the other hand, while executing the wake-upper process 520, the processor 12 outputs a message when the IUT 530 completes its execution. If a wake-up message was received, then the wake-upper 520 has simply indicated that the IUT 530 properly completed the test. Thus, the processor returns to step 602 and the next test case file is interpreted.

Contemporaneously while the processor 12 executes the tester process 530, the processor 12 also executes the wake-upper process 520. Illustratively, the wake-upper process 520 executes at a lower priority than the tester process. In such a case, the wake-upper process 520 does not execute unless and until the tester process 510 and IUT 530 are both idle.

The sole purpose of the wake-upper process is to notify the tester process 510 if the IUT 530 properly ceases execution when expected or if the IUT 530 unexpectedly ceases execution. If either condition occurs, the processor 12 (while executive the wake-upper process 520) generates an appropriate wake-up message. The wake-up message is received while the processor 12 executes the catcher sub-process 514 of the tester process 510.

The test system 500 utilizes message passing as the only channel for communicating between different executing processes such as the IUT 530, the tester process 510 and the wake-upper process 520. Almost all protocol software can be implemented as a process which communicates in such a fashion. Thus, the test system 500 can be used to test the majority of communications protocol software. The test system 500 can be used with the following protocols: LAPD (Q.921), Q.931, X.25PLP, LAPB, T.70, T.62, DTAM, and V.120.

Figure 1:
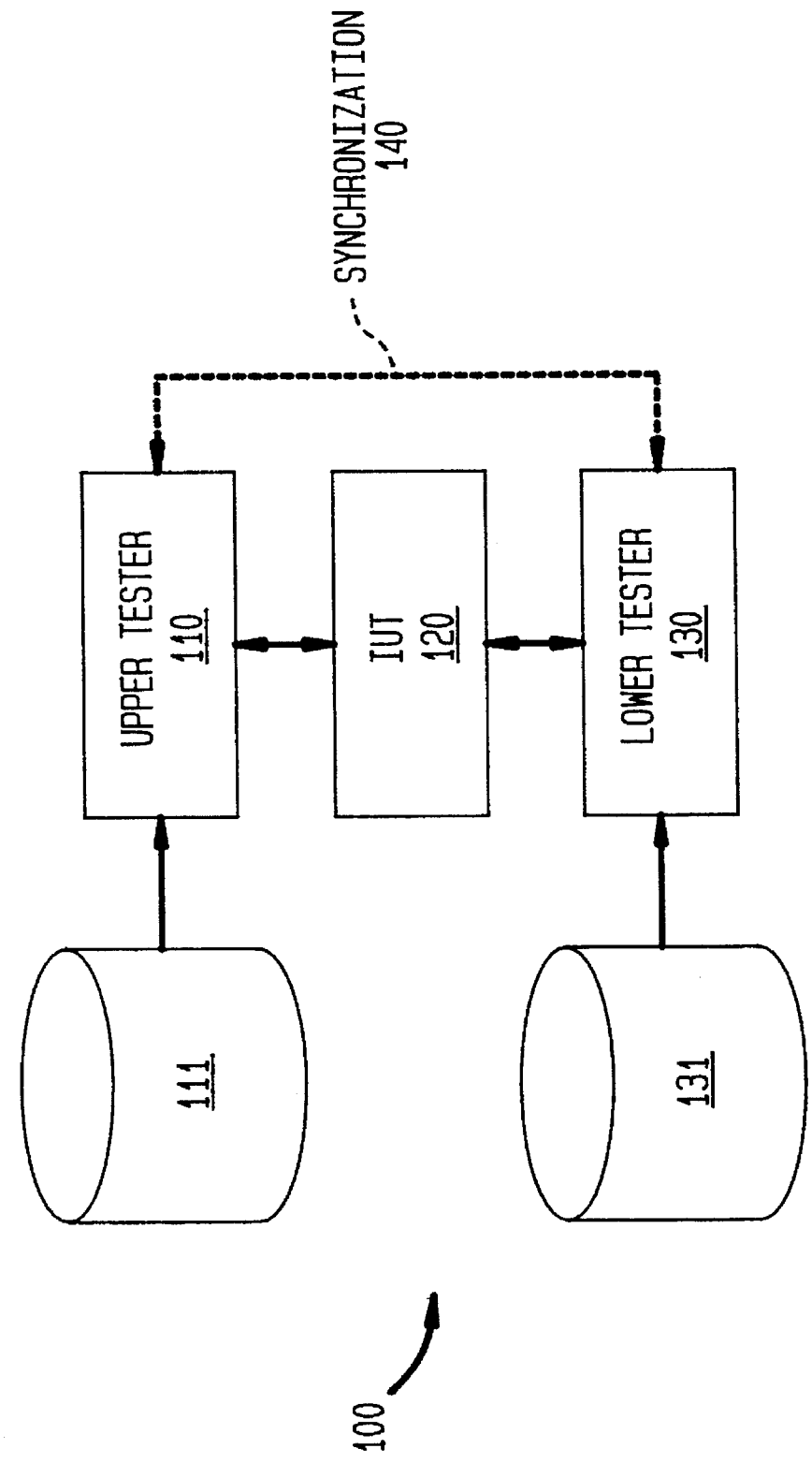
FIG. 1 depicts a conventional communications protocol software test system architecture.
Figure 2:
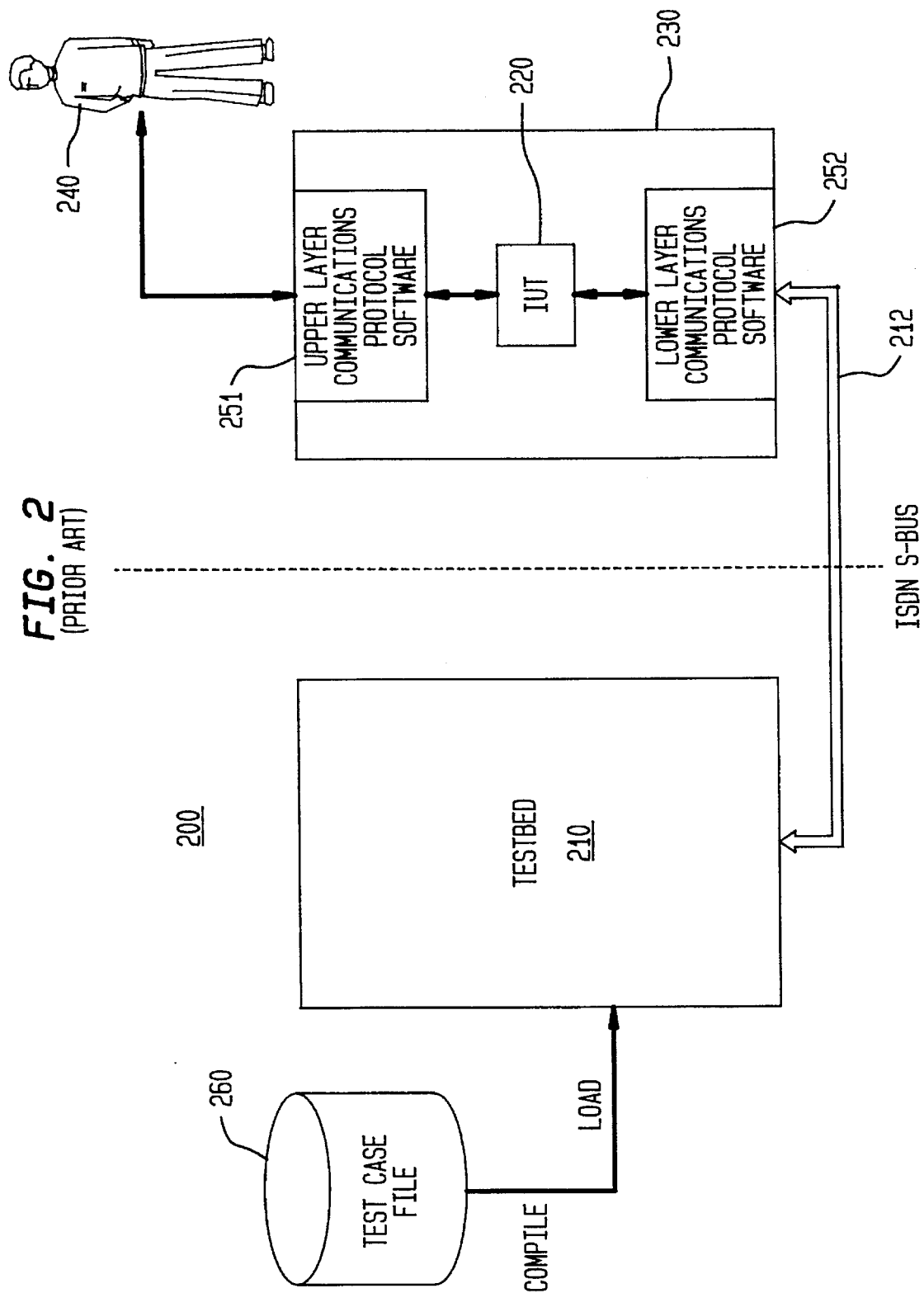
FIG. 2 depicts a functional diagram of a first conventional communications protocol software test system.
Figure 3:
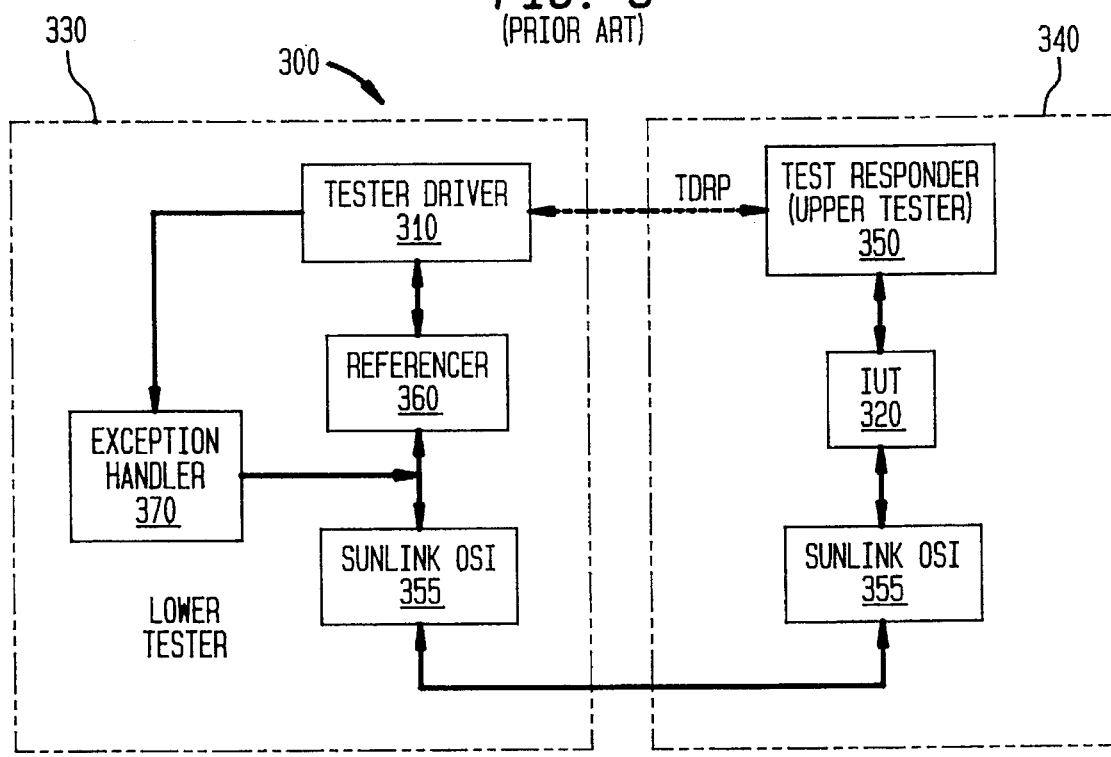
FIG. 3 depicts a functional diagram of a second conventional communications protocol software test system.

The interpretive test system provides significant advantages over the prior art. For example, the testing of X.25PLP using the conventional system 200 of FIG. 2 would require over four hours for applying all 90 test cases of a particular test plan. In contrast, the test system 500 can apply the same tests in less than four minutes and automatically generates a test report. Moreover, the test coverage is not limited by upper and lower testers, which may filter out erroneous results produced by the IUT 530.

In short, a test system has been disclosed with a processor which executes a tester process for sequentially interpreting each frame in a test case file. In response to interpreting an input data frame, the processer feeds the data contained in the frame to the implementation under test. In response to an output data frame, the processor compares the expected output data contained in the output data frame with output data received from the IUT. Depending on the comparison, the processor writes messages in a test report file. The processor may also simultaneously execute a wake-upper process for determining whether the IUT properly ceases execution or whether the IUT unexpectedly ceases execution. In response to the IUT properly or improperly ceasing execution, the processor (while executing the wake-upper process) generates a wake-up message. In response to receiving a wake-up message indicating that the IUT improperly ceased execution, the processor (while executing the tester process) writes an error message in the test report file.

Finally, the above invention has been described with reference to illustrative embodiments. Numerous other embodiments may be devised by those having ordinary skill in the art without departing from the spirit and scope of the following claims.

APPENDIX A

*Example of testcase file*  PAGE 1

```
 1    ******************************************************************
 2    *****   Test case 1: X.25 call connecting                    *****
 3    *****   ====================================================   *****
 4    *****   Created by  Hsu_Feng Cheng  on  Sep. 8, 1992.        *****
 5    *****   ------------------------------------------------------   *****
 6    *****   1st update by                          on            *****
 7    *****        Subject:                                        *****
 8    ******************************************************************
 9
10    Summary :
11
12              Layer 1                    LPAD + X.25 PLP + PAD
13    ------------------------------   ------------------------------
14
15    [  1 ]         PH_ACT_IND    --->
16    [  3 ]                       <--- LAPD SABME
17    [  4 ]           LAPD UA     --->
18    [  5 ]                       <--- X.25 RESTART
19    [  6 ]           LAPD RR     --->
20    [ 10 ]      X.25 RESTART     --->
21    [ 11 ]                       <--- LAPD RR
22    [ 12 ] X.25 RESTART_CONF     --->
23    [ 13 ]                       <--- LAPD RR
24    [ 14 ] X.25 INCOMING_CALL    --->
25    [ 15 ]                       <--- LAPD RR
26    [ 18 ]                       <--- X.25 CALL_CONNECT
27    [ 20 ]           LAPD RR     --->
28
29    ==================================================================
30
31    @_DX23 [    1 ]  ==   PH_ACTIVATE_IND
32         HEADER    1  2  3  4  5  6  7  8  9    2  0  1    1105
33         {   0 }
34         {   0 }
35
36    @_DX23 SET 2  Ue8=16
37                 Uf8=40    SAPI = 16;  (SAPI<<2) = 40
38
39    @_DX23 [    3 ]  ==   SABME p=1 to NT
```

Example of testcase file

PAGE 2

```
40      HEADER   1  2  3  4  5  6  7  8  9    2  1  1    1208
41       {  b } ? ? ? ? ? ? ? ? ? ? 0
42       {  3 } Uf8 Sf0 7f
43
44   @_DX23 [    4 ]  ==  UA f=1 to TE
45      HEADER   1  2  3  4  5  6  7  8  9    2  0  1    1109
46       {  0 }
47       {  3 } Uf8 Uf0 73
48
49   @_DX23 SET 1 U0=0   N(S) = 0
50   @_DX23 SET 1 U1=0   N(R) = 0
51
52   @_DX23 [    5 ]  ==  RESTART I p=0, N(S)=0, N(R)=0 to NT
53      HEADER   1  2  3  4  5  6  7  8  9    2  1  1    1208
54       {  b } ? ? ? ? ? ? ? ? ? ? 1
55       {  9 } Uf8 Uf0 U0 U1 10 00 fb 00 00
56
57   @_DX23 SET 1 U0+2   N(S) = N(S)+1
58
59   @_DX23 [    6 ]  ==  RR resp, f=0, N(R)=1 to TE
60      HEADER   1  2  3  4  5  6  7  8  9    2  0  1    1109
61       {  0 }
62       {  4 } Uf8 Uf0 01 U0
63
64   @_DX23 [   10 ]  ==  RESTART I p=0, N(S)=0, N(R)=1 to TE
65      HEADER   1  2  3  4  5  6  7  8  9    2  0  1    1109
66       {  0 }
67       {  9 } Uf8+2 Uf0 U1 U0 10 00 fb 00 00
68
69   @_DX23 SET 1 U1+2   N(R) = N(R)+1
70
71   @_DX23 [   11 ]  ==  RR resp, f=0, N(R)=1 to NT
72      HEADER   1  2  3  4  5  6  7  8  9    2  1  1    1208
73       {  0 }
74       {  4 } Uf8+2 Uf0 01 U1
75
76   @_DX23 [   12 ]  ==  RESTART_CONF I p=0, N(S)=1, N(R)=1 to TE
77      HEADER   1  2  3  4  5  6  7  8  9    2  0  1    1109
78       {  0 }
79       {  7 } Uf8+2 Uf0 U1 U0 10 00 ff
```

Example of testcase file PAGE 3

```
 80
 81   @_DX23 SET 1 U1+2   N(R) = N(R)+1
 82
 83   @_DX23 [    13 ]  ==   RR resp, f=0, N(R)=2 to NT
 84        HEADER    1  2  3  4  5  6  7  8  9    2  1  1    1208
 85        {   0 }
 86        {   4 } Uf8+2 Uf0 01 U1
 87
 88   @_DX23 [    14 ]  ==   CALL I p=0, N(S)=2, N(R)=1 to TE
 89        HEADER    1  2  3  4  5  6  7  8  9    2  0  1    1109
 90        {   0 }
 91        {   9 } Uf8+2 Uf0 U1 U0 10 06 0b 00 00
 92
 93   @_DX23 SET 1 U1+2   N(R) = N(R)+1
 94
 95   @_DX23 [    15 ]  ==   RR resp, f=0, N(R)=3 to NT
 96        HEADER    1  2  3  4  5  6  7  8 .9    2  1  1    1208
 97        {   b } ? ? ? ? ? ? ? ? ? 0
 98        {   4 } Uf8+2 Uf0 01 U1
 99
100   @_DX23 [    18 ]  ==   CALL_CONN I p=0, N(S)=1, N(R)=3 to NT
101        HEADER    1  2  3  4  5  6  7  8  9    2  1  1    1208
102        {   b } ? ? ? ? ? ? ? ? ? 1
103        {   9 } Uf8 Uf0 U0 U1 10 06 0f 00 00
104
105   @_DX23 SET 1 U0+2   N(S) = N(S)+1
106
107   @_DX23 [    20 ]  ==   RR resp, f=0, N(R)=2 to TE
108        HEADER    1  2  3  4  5  6  7  8  9    2  0  1    1109
109        {   0 }
110        {   4 } Uf8 Uf0 01 U0
```

Example of testcase file                                          PAGE 4

```
111   *********************************************************************
112   *****    Test case 2: X.25 data receiving                       *****
113   *****    ====================================================   *****
114   *****    Created by  Jung-Ming Fang  on  Sep. 8, 1992.          *****
115   *****    ----------------------------------------------------   *****
116   *****    1st update by                     on                   *****
117   *****         Subject:                                          *****
118   *********************************************************************
119
120   Summary :
121
122             Layer 1                      LPAD + X.25 PLP + PAD
123   ----------------------------------    ----------------------------------
124
125    [ 2 ]         X.25 DATA  --->
126    [ 4 ]                      <--- LAPD RR
127    [ 5 ]                      <--- X.25 RR
128    [ 6 ]         X.25 DATA  --->
129    [ 8 ]            LAPD RR --->
130
131    GOTO 4
132
133   ================================================================
134
135   @_DX23 SET 1 U2=0   P(S) = 0
136   @_DX23 SET 1 U3=0   P(R) = 0
137
138   @_DX23 [    2 ]  ==  X25_DATA I p=0, N(S)=3, N(R)=2 to TE
139       HEADER   1  2  3  4  5  6  7  8  9    2  0  1      1109
140       (    0 )
141       (    d )  Uf8+2 Uf0 U1 U0 1C 06 U3 41 42 43 44 45 46
142
143   @_DX23 SET 1 U1+2   N(R) = N(R)+1
144
145   @_DX23 [    4 ]  ==  RR resp, f=0 to NT
146       HEADER   1  2  3  4  5  6  7  8  9    2  1  1      1208
147       (    0 )
148       (    4 )  Uf8+2 Uf0 01 U1
149
150   @_DX23 SET 1 U3+2&f   P(R) = P(R)+1
```

Example of testcase file                                         PAGE 5

```
151
152    @_DX23 [     5 ]   ==  X25_RR I p=0 to NT
153        HEADER    1  2  3  4  5  6  7  8  9    2  1 .1     1208
154        {    b }  ?  ?  ?  ?  ?  ?  ?  ?  ?  1
155        {    7 }  Uf8 Uf0 U0 U1 10   6   U3<4|1
156
157    @_DX23 [     6 ]   ==  X25_DATA I p=0 to TE
158        HEADER    1  2  3  4  5  6  7  8  9    2  0  1     1109
159        {    0 }
160        {    d }  Uf8+2 Uf0 U1 U0 10  06  U3 41 42 43 44 45 46
161
162    @_DX23 SET 1 U0+2   N(S) = N(S)+1
163
164    @_DX23 [     8 ]   ==  RR resp, f=0 to TE
165        HEADER    1  2  3  4  5  6  7  8  9    2  0  1     1109
166        {    0 }
167        {    4 }  Uf8 Uf0 01 U0
168
169    @_DX23 SET 1 U1+2   N(R) = N(R)+1
170
171    @_DX23 GOTO  4
```

APPENDIX B

---

*Example of test report*                                                         PAGE 1

```
 1
 2
 3    @@@  Current Test Case filename is testcase.1   @@@
 4
 5    [ 1|1 ]   HEADER:    1   2   3   4   5   6   7   8   9   2   0   1
 6         Feeding:    LAYER1 ---> LAPD:   1105   ( 0 ), ( 0 )
 7
 8    [ 3|2 ]   HEADER:    1   2   3   4   5   6   7   8   9   2   1   1
 9         Expected:   LAYER1 <= = LAPD:   1208   ( b ), ( 3 )
10            ?   ?   ?   ?   ?   ?   ?   ?   ?   ?   0
11           40   sf0  7f
12
13         Catched:    LAYER1 <--- LAPD:   1208   ( 16 ), ( 3 )
14            0   0   0   0   0   0   0   0   0   0   0   0   0   0   0
15            0   0   0   0   0   0
16           40   7   7f
17         $$$ Compared OK!
18
19    [ 4|3 ]   HEADER:    1   2   3   4   5   6   7   8   9   2   0   1
20         Feeding:    LAYER1 ---> LAPD:   1109   ( 0 ), ( 3 )
21           40   7   73
22
23    [ 5|4 ]   HEADER:    1   2   3   4   5   6   7   8   9   2   1   1
24         Expected:   LAYER1 <= = LAPD:   1208   ( b ), ( 9 )
25            ?   ?   ?   ?   ?   ?   ?   ?   ?   ?   1
26           40   7   0   0   10   0   fb   0   0
27
28         Catched:    LAYER1 <--- LAPD:   1208   ( 16 ), ( 9 )
29            0   0   0   0   0   0   0   0   0   1   0   0   0   0   0
30            0   0   0   0   0   0
31           40   7   0   0   10   0   fb   0   0
32         $$$ Compared OK!
33
34    [ 6|5 ]   HEADER:    1   2   3   4   5   6   7   8   9   2   0   1
35         Feeding:    LAYER1 ---> LAPD:   1109   ( 0 ), ( 4 )
36           40   7   1   2
37
38    [ 10|6 ]  HEADER:    1   2   3   4   5   6   7   8   9   2   0   1
39         Feeding:    LAYER1 ---> LAPD:   1109   ( 0 ), ( 9 )
```

Example of test report

PAGE 2

```
40        42   7   0   2  10   0  fb   0   0
41
42   [ 11|7 ]   HEADER:   1   2   3   4   5   6   7   8   9   2   1   1
43        Expected:   LAYER1 <= = LAPD:   1208   { 0 }, { 4 }
44        42   7   1   2
45
46        Catched:   LAYER1 <--- LAPD:   1208   { 16 }, { 4 }
47         0   0   0   0   0   0   0   0   0   0   0   0   0   0   0   0
48         0   0   0   0   0   0
49        42   7   1   2
50        $$$ Compared OK!
51
52   [ 12|8 ]   HEADER:   1   2   3   4   5   6   7   8   9   2   0   1
53        Feeding:   LAYER1 ---> LAPD:   1109   { 0 }, { 7 }
54        42   7   2   2  10   0  ff
55
56   [ 13|9 ]   HEADER:   1   2   3   4   5   6   7   8   9   2   1   1
57        Expected:   LAYER1 <= = LAPD:   1208   { 0 }, { 4 }
58        42   7   1   4
59
60        Catched:   LAYER1 <--- LAPD:   1208   { 16 }, { 4 }
61         0   0   0   0   0   0   0   0   0   0   0   0   0   0   0   0
62         0   0   0   0   0   0
63        42   7   1   4
64        $$$ Compared OK!
65
66   [ 14|10 ]   HEADER:   1   2   3   4   5   6   7   8   9   2   0   1
67        Feeding:   LAYER1 ---> LAPD:   1109   { 0 }, { 9 }
68        42   7   4   2  10   6   b   0   0
69
70   [ 15|11 ]   HEADER:   1   2   3   4   5   6   7   8   9   2   1   1
71        Expected:   LAYER1 <= = LAPD:   1208   { b }, { 4 }
72         ?   ?   ?   ?   ?   ?   ?   ?   ?   0
73        42   7   1   6
74
75        Catched:   LAYER1 <--- LAPD:   1208   { 16 }, { 4 }
76         0   0   0   0   0   0   0   0   0   0   0   0   0   0   0   0
77         0   0   0   0   0   0
78        42   7   1   6
79        $$$ Compared OK!
```

Example of test report

PAGE 3

```
 80
 81   [ 18|12 ]   HEADER:   1   2   3   4   5   6   7   8   9   2   1   1
 82         Expected:   LAYER1 <= = LAPD:   1208   { b },  { 9 }
 83            ?    ?   ?   ?   ?   ?   ?   ?   ?   1
 84           40    7   2   6  10   6   f   0   0
 85
 86         Catched:    LAYER1 <--- LAPD:   1208   { 16 },  { 9 }
 87            0    0   0   0   0   0   0   0   0   1   0   0   0   0   0
 88            0    0   0   0   0   0
 89           40    7   2   6  10   6   f   0   0
 90         $$$ Compared OK!
 91
 92   [ 20|13 ]   HEADER:   1   2   3   4   5   6   7   8   9   2   0   1
 93         Feeding:    LAYER1 ---> LAPD:   1109   { 0 },  { 4 }
 94           40    7   1   4
 95
 96   ###  File read completely, testcase.1 closed.  ###
 97
 98   !!!  There should be no more output  !!!
 99
100
101   @@@  Current Test Case filename is testcase.2  @@@
102
103   [ 2|14 ]    HEADER:   1   2   3   4   5   6   7   8   9   2   0   1
104         Feeding:    LAYER1 ---> LAPD:   1109   { 0 },  { d }
105           42    7   6   4  10   6   0  41  42  43  44  45  46
106
107   [ 4|15 ]    HEADER:   1   2   3   4   5   6   7   8   9   2   1   1
108         Expected:   LAYER1 <= = LAPD:   1208   { 0 },  { 4 }
109           42    7   1   8
110
111         Catched:    LAYER1 <--- LAPD:   1208   { 16 },  { 4 }
112            0    0   0   0   0   0   0   0   0   0   0   0   0   0   0
113            0    0   0   0   0   0
114           42    7   1   8
115         $$$ Compared OK!
116
117   [ 5|16 ]    HEADER:   1   2   3   4   5   6   7   8   9   2   1   1
118         Expected:   LAYER1 <= = LAPD:   1208   { b },  { 7 }
119            ?    ?   ?   ?   ?   ?   ?   ?   ?   1
```

Example of test report

PAGE 4

```
120        40     7     4     8    10     6    21
121
122        Catched:    LAYER1 <--- LAPD:    1208   { 16 }, { 7 }
123          0     0     0     0     0     0     0     0     0     1     0     0     0     0     0
124          0     0     0     0     0     0
125         40     7     4     8    10     6    21
126        $$$ Compared OK!
127
128   [ 6|17 ]   HEADER:       1     2     3     4     5     6     7     8     9     2     0     1
129        Feeding:    LAYER1 ---> LAPD:    1109   { 0 }, { d }
130         42     7     8     4    10     6     2    41    42    43    44    45    46
131
132   [ 8|18 ]   HEADER:       1     2     3     4     5     6     7     8     9     2     0     1
133        Feeding:    LAYER1 ---> LAPD:    1109   { 0 }, { 4 }
134         40     7     1     6
135
136   [ 4|19 ]   HEADER:       1     2     3     4     5     6     7     8     9     2     1     1
137        Expected:   LAYER1 <= = LAPD:    1208   { 0 }, { 4 }
138         42     7     1     a
139
140        Catched:    LAYER1 <--- LAPD:    1208   { 16 }, { 4 }
141          0     0     0     0     0     0     0     0     0     0     0     0     0     0     0
142          0     0     0     0     0     0
143         42     7     1     a
144        $$$ Compared OK!
145
146   [ 5|20 ]   HEADER:       1     2     3     4     5     6     7     8     9     2     1     1
147        Expected:   LAYER1 <= = LAPD:    1208   { b }, { 7 }
148          ?     ?     ?     ?     ?     ?     ?     ?     ?     1
149         40     7     6     a    10     6    41
150
151        Catched:    LAYER1 <--- LAPD:    1208   { 16 }, { 7 }
152          0     0     0     0     0     0     0     0     0     1     0     0     0     0     0
153          0     0     0     0     0     0
154         40     7     6     a    10     6    41
155        $$$ Compared OK!
156
157   [ 6|21 ]   HEADER:       1     2     3     4     5     6     7     8     9     2     0     1
158        Feeding:    LAYER1 ---> LAPD:    1109   { 0 }, { d }
159         42     7     a     6    10     6     4    41    42    43    44    45    46
```

Example of test report                                    PAGE 5

```
160
161   [ 8|22 ]   HEADER:    1   2   3   4   5   6   7   8   9   2   0   1
162        Feeding:   LAYER1 ---> LAPD:   1109   { 0 }, { 4 }
163            40    7    1    8
164
165   [ 4|23 ]   HEADER:    1   2   3   4   5   6   7   8   9   2   1   1
166        Expected:  LAYER1 <= = LAPD:   1208   { 0 }, { 4 }
167            42    7    1    c
168
169        Catched:   LAYER1 <--- LAPD:   1208   { 16 }, { 4 }
170            0    0    0    0    0    0    0    0    0    0    0    0    0    0    0    0
171            0    0    0    0    0    0
172            42   7    1    c
173        $$$ Compared OK!
174
175   [ 5|24 ]   HEADER:    1   2   3   4   5   6   7   8   9   2   1   1
176        Expected:  LAYER1 <= = LAPD:   1208   { b }, { 7 }
177            ?    ?    ?    ?    ?    ?    ?    ?    ?    ?    1
178            40   7    8    c    10   6    61
179
180        Catched:   LAYER1 <--- LAPD:   1208   { 16 }, { 7 }
181            0    0    0    0    0    0    0    0    0    1    0    0    0    0    0
182            0    0    0    0    0    0
183            40   7    8    c    10   6    61
184        $$$ Compared OK!
185
186   [ 6|25 ]   HEADER:    1   2   3   4   5   6   7   8   9   2   0   1
187        Feeding:   LAYER1 ---> LAPD:   1109   { 0 }, { d }
188            42   7    c    8    10   6    6    41   42   43   44   45   46
189
190   [ 8|26 ]   HEADER:    1   2   3   4   5   6   7   8   9   2   0   1
191        Feeding:   LAYER1 ---> LAPD:   1109   { 0 }, { 4 }
192            40   7    1    a
193
194   [ 4|27 ]   HEADER:    1   2   3   4   5   6   7   8   9   2   1   1
195        Expected:  LAYER1 <= = LAPD:   1208   { 0 }, { 4 }
196            42   7    1    e
197
198        Catched:   LAYER1 <--- LAPD:   1208   { 16 }, { 4 }
199            0    0    0    0    0    0    0    0    0    0    0    0    0    0    0    0
```

Example of test report    PAGE 6

```
200           0    0    0    0    0    0
201          42    7    1    e
202       $$$ Compared OK!
203
204   [ 5|28 ]   HEADER:    1    2    3    4    5    6    7    8    9    2    1    1
205       Expected:  LAYER1 <= = LAPD:    1208   { b }, { 7 }
206           ?    ?    ?    ?    ?    ?    ?    ?    ?    1
207          40    7    a    e    10   6    81
208
209       Catched:   LAYER1 <--- LAPD:    1208   { 16 }, { 7 }
210           0    0    0    0    0    0    0    0    0    1    0    0    0    0    0
211           0    0    0    0    0    0
212          40    7    a    e    10   6    81
213       $$$ Compared OK!
214
215   [ 6|29 ]   HEADER:    1    2    3    4    5    6    7    8    9    2    0    1
216       Feeding:   LAYER1 ---> LAPD:    1109   { 0 }, { d }
217          42    7    e    a    10   6    8    41   42   43   44   45   46
218
219   [ 8|30 ]   HEADER:    1    2    3    4    5    6    7    8    9    2    0    1
220       Feeding:   LAYER1 ---> LAPD:    1109   { 0 }, { 4 }
221          40    7    1    c
222
223   [ 4|31 ]   HEADER:    1    2    3    4    5    6    7    8    9    2    1    1
224       Expected:  LAYER1 <= = LAPD:    1208   { 0 }, { 4 }
225          42    7    1    10
226
227       Catched:   LAYER1 <--- LAPD:    1208   { 16 }, { 4 }
228           0    0    0    0    0    0    0    0    0    0    0    0    0    0    0
229           0    0    0    0    0    0
230          42    7    1    10
231       $$$ Compared OK!
232
233   [ 5|32 ]   HEADER:    1    2    3    4    5    6    7    8    9    2    1    1
234       Expected:  LAYER1 <= = LAPD:    1208   { b }, { 7 }
235           ?    ?    ?    ?    ?    ?    ?    ?    ?    1
236          40    7    c    10   10   6    a1
237
238       Catched:   LAYER1 <--- LAPD:    1208   { 16 }, { 7 }
239           0    0    0    0    0    0    0    0    0    1    0    0    0    0
```

Example of test report
PAGE 7

```
240          0    0    0    0    0    0
241         40    7    c   10   10    6    a1
242       $$$ Compared OK!
243
244  [ 6|33 ]   HEADER:    1    2    3    4    5    6    7    8    9    2    0    1
245       Feeding:    LAYER1 ---> LAPD:  1109   { 0 }, { d }
246         42    7   10    c   10    6    a   41   42   43   44   45   46
247
248  [ 8|34 ]   HEADER:    1    2    3    4    5    6    7    8    9    2    0    1
249       Feeding:    LAYER1 ---> LAPD:  1109   { 0 }, { 4 }
250         40    7    1    e
251
252  [ 4|35 ]   HEADER:    1    2    3    4    5    6    7    8    9    2    1    1
253       Expected:   LAYER1 <= = LAPD:  1208   { 0 }, { 4 }
254         42    7    1   12
255
256       Catched:    LAYER1 <--- LAPD:  1208   { 16 }, { 4 }
257          0    0    0    0    0    0    0    0    0    0    0    0    0    0    0
258          0    0    0    0    0    0
259         42    7    1   12
260       $$$ Compared OK!
261
262  [ 5|36 ]   HEADER:    1    2    3    4    5    6    7    8    9    2    1    1
263       Expected:   LAYER1 <= = LAPD:  1208   { b }, { 7 }
264          ?    ?    ?    ?    ?    ?    ?    ?    ?    ?    1
265         40    7    e   12   10    6   c1
266
267       Catched:    LAYER1 <--- LAPD:  1208   { 16 }, { 7 }
268          0    0    0    0    0    0    0    0    0    0    1    0    0    0    0
269          0    0    0    0    0    0
270         40    7    e   12   10    6   c1
271       $$$ Compared OK!
272
273  [ 6|37 ]   HEADER:    1    2    3    4    5    6    7    8    9    2    0    1
274       Feeding:    LAYER1 ---> LAPD:  1109   { 0 }, { d }
275         42    7   12    e   10    6    c   41   42   43   44   45   46
276
277  [ 8|38 ]   HEADER:    1    2    3    4    5    6    7    8    9    2    0    1
278       Feeding:    LAYER1 ---> LAPD:  1109   { 0 }, { 4 }
279         40    7    1   10
```

Example of test report

PAGE 8

```
280
281    [ 4|39 ]   HEADER:    1   2   3   4   5   6   7   8   9   2   1   1
282         Expected:   LAYER1 <= = LAPD:   1208   { 0 }, { 4 }
283            42    7    1   14
284
285         Catched:    LAYER1 <--- LAPD:   1208   { 16 }, { 4 }
286             0    0    0   0    0    0    0    0    0    0    0    0    0    0    0    0
287             0    0    0   0    0    0
288            42    7    1   14
289         $$$ Compared OK!
290
291    [ 5|40 ]   HEADER:    1   2   3   4   5   6   7   8   9   2   1   1
292         Expected:   LAYER1 <= = LAPD:   1208   { b }; { 7 }
293             ?    ?    ?   ?    ?    ?    ?    ?    ?    ?    1
294            40    7   10   14   10    6   e1
295
296         Catched:    LAYER1 <--- LAPD:   1208   { 16 }, { 7 }
297             0    0    0   0    0    0    0    0    0    1    0    0    0    0    0
298             0    0    0   0    0    0
299            40    7   10   14   10    6   e1
300         $$$ Compared OK!
301
302    [ 6|41 ]   HEADER:    1   2   3   4   5   6   7   8   9   2   0   1
303         Feeding:    LAYER1 ---> LAPD:   1109   { 0 }, { d }
304            42    7   14   10   10    6    e   41   42   43   44   45   46
305
306    [ 8|42 ]   HEADER:    1   2   3   4   5   6   7   8   9   2   0   1
307         Feeding:    LAYER1 ---> LAPD:   1109   { 0 }, { 4 }
308            40    7    1   12
309
310    [ 4|43 ]   HEADER:    1   2   3   4   5   6   7   8   9   2   1   1
311         Expected:   LAYER1 <= = LAPD:   1208   { 0 }, { 4 }
312            42    7    1   16
313
314         Catched:    LAYER1 <--- LAPD:   1208   { 16 }, { 4 }
315             0    0    0   0    0    0    0    0    0    0    0    0    0    0    0    0
316             0    0    0   0    0    0
317            42    7    1   16
318         $$$ Compared OK!
319
```

Example of test report
PAGE 9

```
320    [ 5|44 ]   HEADER:    1   2   3   4   5   6   7   8   9   2   1   1
321         Expected:   LAYER1 <= = LAPD:   1208   { b }, { 7 }
322            ?    ?    ?    ?    ?    ?    ?    ?    ?    ?    1
323           40    7   12   16   10    6    1
324
325         Catched:    LAYER1 <--- LAPD:   1208   { 16 }, { 7 }
326            0    0    0    0    0    0    0    0    0    0    1    0    0    0    0
327            0    0    0    0    0    0
328           40    7   12   16   10    6    1
329         $$$ Compared OK!
330
331    [ 6|45 ]   HEADER:    1   2   3   4   5   6   7   8   9   2   0   1
332         Feeding:    LAYER1 ---> LAPD:   1109   { 0 }; { d }
333           42    7   16   12   10    6    0   41   42   43   44   45   46
334
335    [ 8|46 ]   HEADER:    1   2   3   4   5   6   7   8   9   2   0   1
336         Feeding:    LAYER1 ---> LAPD:   1109   { 0 }, { 4 }
337           40    7    1   14
338
339    [ 4|47 ]   HEADER:    1   2   3   4   5   6   7   8   9   2   1   1
340         Expected:   LAYER1 <= = LAPD:   1208   { 0 }, { 4 }
341           42    7    1   18
342
343         Catched:    LAYER1 <--- LAPD:   1208   { 16 }, { 4 }
344            0    0    0    0    0    0    0    0    0    0    0    0    0    0    0
345            0    0    0    0    0    0
346           42    7    1   18
347         $$$ Compared OK!
348
349    [ 5|48 ]   HEADER:    1   2   3   4   5   6   7   8   9   2   1   1
350         Expected:   LAYER1 <= = LAPD:   1208   { b }, { 7 }
351            ?    ?    ?    ?    ?    ?    ?    ?    ?    ?    1
352           40    7   14   18   10    6   21
353
354         Catched:    LAYER1 <--- LAPD:   1208   { 16 }, { 7 }
355            0    0    0    0    0    0    0    0    0    0    1    0    0    0    0
356            0    0    0    0    0    0
357           40    7   14   18   10    6   21
358         $$$ Compared OK!
```

We claim:

1. In a test system having a memory and a multi-tasking processor, a method for testing a communications protocol software implementation, of a particular layer in a hierarchy of protocols, stored in said memory, said multi-tasking processor contemporaneously executing said communications protocol software implementation, a pre-defined and pre-programmed tester process and a wake-upper process, said tester process comprising the steps of:

using said processor, catching data outputted from said communications protocol software implementation to upper and lower layer communications protocol software, using said processor, interpreting each frame of a sequence of frames, which sequence includes input data frames and output data frames, in response to said processor interpreting an input data frame in said step of interpreting, using said processor to feed input data contained in said input data frame directly to said communications protocol software implementation, and in response to said processor interpreting an output data frame in said step of interpreting, using said processor to compare output data contained in said output data frame with corresponding output data received in said step of catching, and said wake-upper process comprising:

using said processor, generating a single wake-up message for receipt by said tester process in said step of catching contemporaneously with said execution of said tester process and said execution of said communications protocol software implementation, wherein said processor is preliminarily programmed in a predetermined manner to select execution priorities of each process executing thereon in relation to each other so that said processor executes said wake-upper process only when said communications protocol software implementation has ceased executing completely and when said processor waits during said step of catching to receive data outputted from said communication protocol software implementation or said tester process, said tester process being preliminarily programmed in a predetermined manner for receiving said single wake-up message and determining that said communication protocol software implementation has unexpected ceased execution if said single wake-up message is received during said step of catching after said processor interpreted an output frame and said tester process determining that said communication protocol software implementation has properly ceased execution if said single wake-up message is received during said step of catching after the last frame is interpreted in said step of interpreting.

2. The process of claim 1 wherein said step of generating wake-up messages further comprises the step of, if said communications protocol software implementation unexpectedly ceases execution, generating a wake-up message indicating that said communications protocol software implementation has unexpectedly ceased execution.

3. The process of claim 1 wherein said step of generating wake-up messages further comprises the step of, after said processor interprets each frame in a test case file, generating a wake-up message indicating that said communications protocol software implementation has completed processing.

4. The process of claim 1 further comprising the step of, using said processor, electronically generating an error message in response to electronically receiving data outputted from said communications protocol software implementation instead of a wake-up message after said processor interprets each frame in said sequence of frames.

5. The process of claim 1 further comprising prior to said step of interpreting, the step of arranging said input data frames and said output data frames to form said sequence in which said processor interprets said frames in said step of interpreting to simulate expected requests and responses transmitted between said communications protocol software implementation and said upper and lower layer communication protocol software in a particular test.

6. The process of claim 1 wherein said test system further comprises a disk memory and wherein said process further comprises the step of storing said predetermined sequence of frames in a test case file in said disk memory.

7. The process of claim 1 further comprising the step of in response to interpreting a SET frame, using said processor for storing a definite number in an auto-variable.

8. The process of claim 1 further comprising the step of in response to interpreting a GOTO frame, using said processor for resuming interpretation of said frames at a particular frame in said sequence of frames identified by a label contained in said GOTO frame.

9. The process of claim 1 wherein at least one of said frames contains at least one byte of unspecified value wherein said byte of unspecified value is ignored by said processor when interpreting said frames.

10. The process of claim 1 wherein said test system maintains one or more auto-variables.

11. The process of claim 1 wherein said step of comparing further comprises the step of generating test report messages depending on data received in said step of catching.

12. The process of claim 1 wherein said processor successively interprets a plurality of sequences of frames.

13. The process of claim 1 further comprising the step of in response to interpreting an output data frame, using said processor for storing data outputted from said communications protocol software implementation in an auto-variable.

14. A test system for testing a communications protocol software implementation comprising:

a memory for storing a communications protocol software implementation, and a multi-tasking processor for executing said communications protocol software implementation, of a particular layer in a hierarchy of protocols, stored in said memory, for contemporaneously therewith, executing a pre-defined and pre-programmed tester process including using said processor:

for catching data outputted form said communications protocol software implementation to upper and lower layer communications protocol software, for interpreting each frame of a sequence of frames which sequence includes input data frames and output data frames, for, in response to interpreting an input data frame, feeding input data contained in said input data frame directly to said communications protocol software implementation, for, in response to interpreting an output data frame, comparing output data contained in said output data frame with corresponding output data received by said processor from said communications protocol software implementation, and, contemporaneously with executing said communications protocol software implementation and said tester process, for executing a wake-upper process including using said processor for generating a single wake-up message for receipt by said tester process in said step of catching contemporaneously with said execution of said tester process and said execution of said communications protocol software implementation, wherein said processor is preliminarily programmed in a predetermined manner to select execution priorities of each process executing thereon so that said processor executes said wake-upper process only when said communications protocol software implementation has ceased executing completely and when said processor waits during said step of catching to receive data outputted from said communications protocol software implementation of said tester process, and wherein said tester process is preliminarily programmed in a predetermined manner for receiving said single wake-up message and determining that said communications protocol software implementation has unexpectedly ceased execution if said single wake-up message is received during said step of catching after said processor interpreted an output frame and said tester process determining that said communication protocol software implementation has properly ceased execution if said single wake-up message is received during said step of catching after the last frame is interpreted in said step of interpreting.

15. The system of claim 14 wherein said step of monitoring further comprises generating wake-up messages only when both said communications protocol software implementation and said tester process are idle, said wake-up messages to be received by said processor while catching output data from said communications protocol software implementation.

* * * * *